US006448551B1

(12) United States Patent
Kersey

(10) Patent No.: US 6,448,551 B1
(45) Date of Patent: Sep. 10, 2002

(54) FIBER BRAGG GRATING SENSOR SYSTEM HAVING ENHANCED STRAIN-TO-WAVELENGTH RESPONSIVITY BY USING A SPECTRAL BEATING BASED VERNIER EFFECT

(75) Inventor: Alan D. Kersey, South Glastonbury, CT (US)

(73) Assignee: Weatherford/Lamb, Inc., Houston, TX (US)

(*) Notice: Subject to any disclaimer, the term of this patent is extended or adjusted under 35 U.S.C. 154(b) by 0 days.

(21) Appl. No.: 09/449,596

(22) Filed: Nov. 29, 1999

(51) Int. Cl.[7] .............................................. G02F 1/025
(52) U.S. Cl. ....................... 250/227.14; 250/18; 250/23; 385/12
(58) Field of Search ........................ 250/227.14, 227.18, 250/227.19, 227.23, 227.27; 385/12

(56) References Cited

U.S. PATENT DOCUMENTS

| 5,410,404 A | | 4/1995 | Kersey et al. ............... 356/345 |
| 5,513,913 A | * | 5/1996 | Ball et al. .................... 374/120 |
| 5,706,079 A | | 1/1998 | Kersey ........................ 356/5.09 |
| 5,945,666 A | * | 8/1999 | Kersey et al. .......... 250/227.14 |
| 6,067,391 A | * | 3/2000 | Land ............................ 385/27 |
| 6,278,811 B1 | * | 8/2001 | Hay .............................. 385/13 |

FOREIGN PATENT DOCUMENTS

| GB | 2323441 | 9/1998 |
| WO | 0077562 | 12/2000 |

OTHER PUBLICATIONS

Kersey et al., "Fiber Grating Sensors", Journal of Lightwave Tech., vol. 15, No. 8, Aug. 1997, pp. 1442–1463.*

K. Bloetekjaer, "Theoretical Concepts of a Novel Vernier–Based Fringe–Counting Fibre Optic Sensor", vol. 144, No. 3, Jun. 1, 1997, pp. 126–129, XP000730364, IEE Proceedings: Optoelectronics, Institution of Electrical Engineers.

* cited by examiner

Primary Examiner—Seungsook Ham
Assistant Examiner—Bradford Hill
(74) Attorney, Agent, or Firm—Ware, Fressola, Van Der Sluys & Adolphson LLP

(57) ABSTRACT

A fiber Bragg grating sensor system for sensing a parameter, including temperature or strain comprises a structured sensor fiber Bragg grating in combination with a broadband light source, coupler, readout grating mixing and spectral analysis system. The structured sensor fiber Bragg grating combination responds to an optical signal, and further responds to a sensed parameter, for providing a structured sensor fiber Bragg grating signal containing information about the sensed parameter. The broadband light source, coupler, readout grating mixing and spectral analysis system provides the optical signal, and responds to the structured sensor fiber Bragg grating signal, mixes the structured sensor fiber Bragg grating with a reference grating spectrum, for providing a broadband source, coupler, readout grating mixing and spectral analysis system signal containing information about a mixed and spectrally analyzed structured sensor fiber Bragg grating signal that is used to determine the sensed parameter. The structured sensor fiber Bragg grating signal may be reflected off a structured readout fiber Bragg grating, and a combined structured sensor and readout fiber Bragg grating signal is spectrally analyzed. The structured sensor fiber Bragg grating signal may also be analyzed with an optical spectrum analyzer, then electronically mixed and multiplied with a simulated reference grating spectrum in a spectrum weighting device.

7 Claims, 8 Drawing Sheets

SENSOR SYSTEM SCHEMATIC

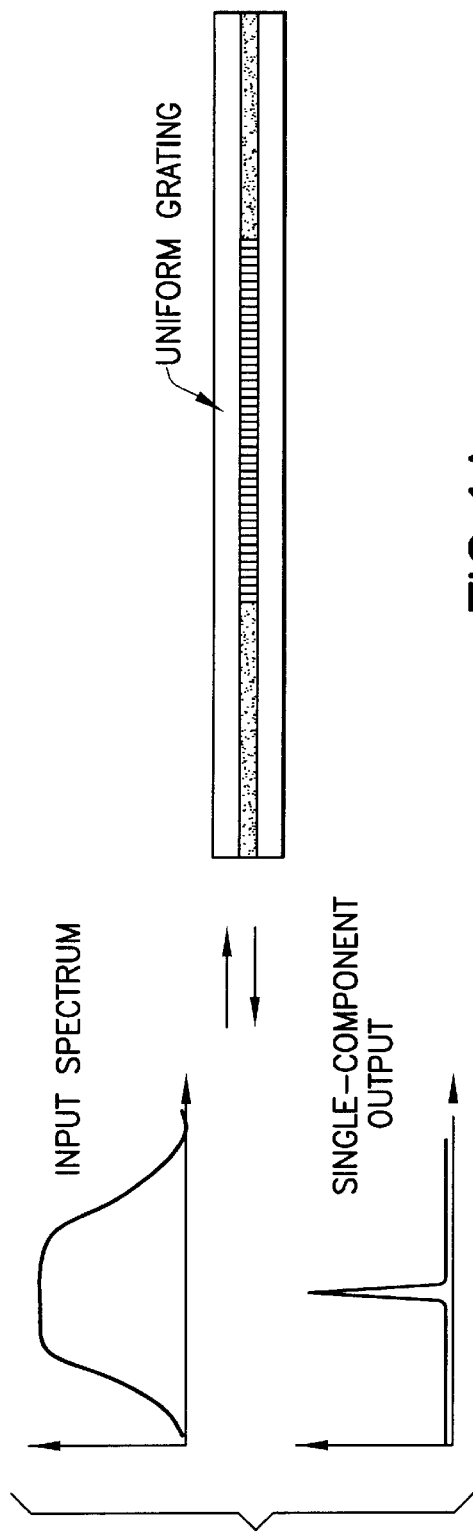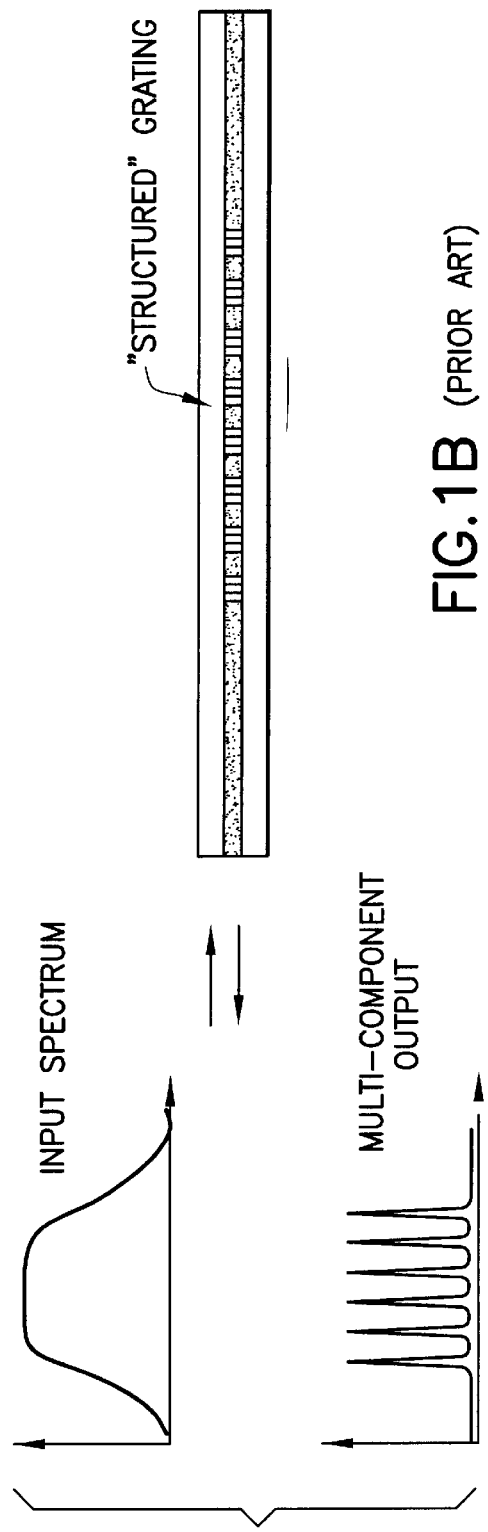
FIG. 1A (PRIOR ART)
FIG. 1B (PRIOR ART)

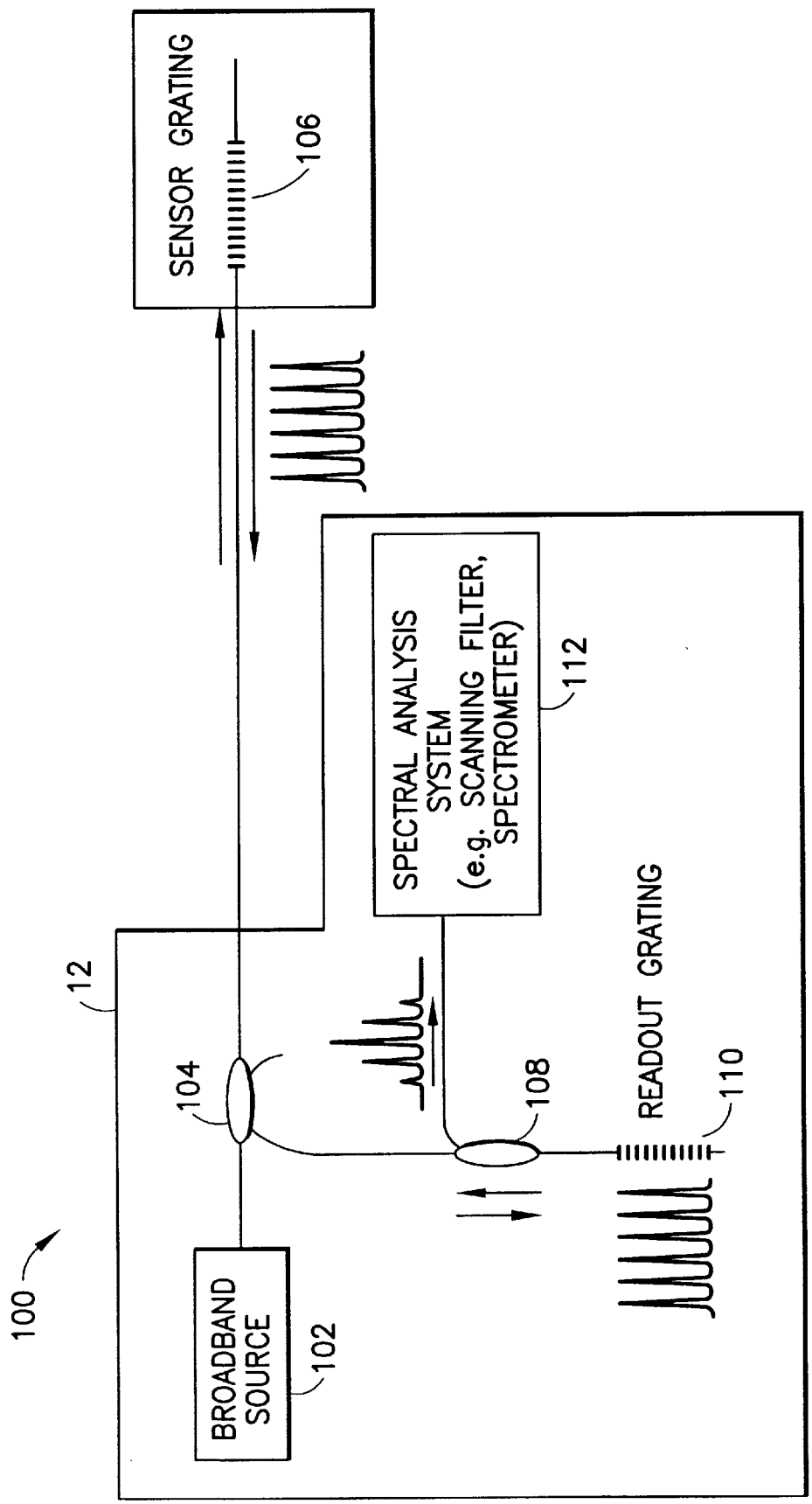
FIG.3 SENSOR SYSTEM SCHEMATIC

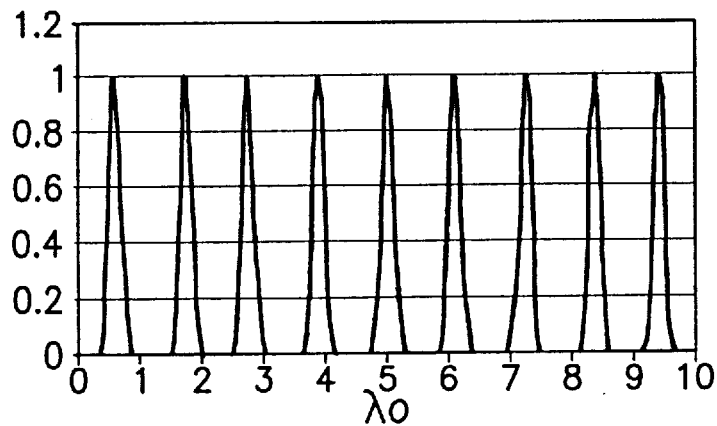
FIG. 4A SENSOR GRATING SPECTRUM — $\Delta\lambda = 1.1$nm
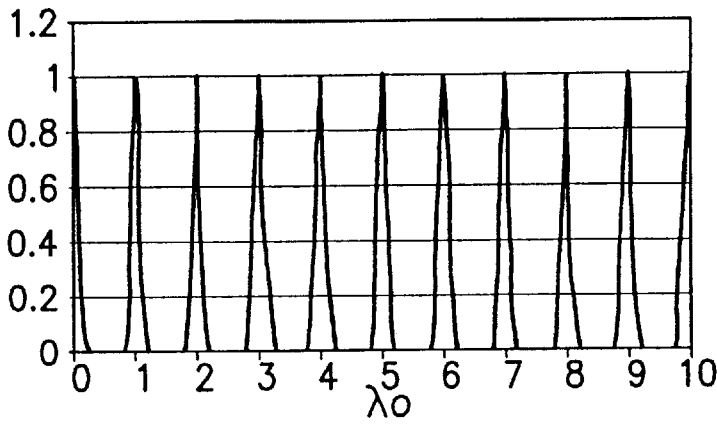
FIG. 4B READOUT GRATING SPECTRUM — $\Delta\lambda = 1.0$nm
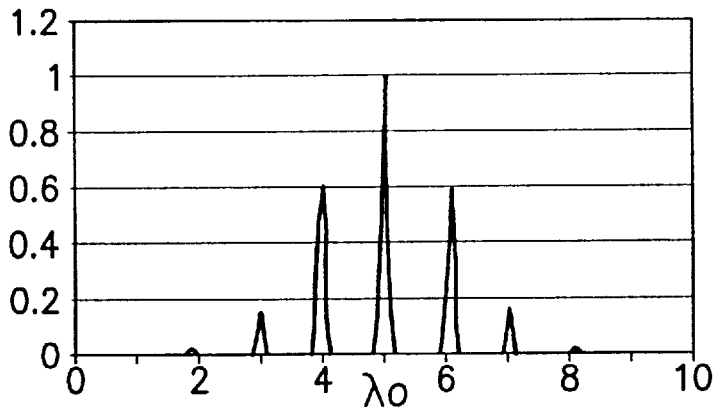
FIG. 4C BEAT GRATING SPECTRUM

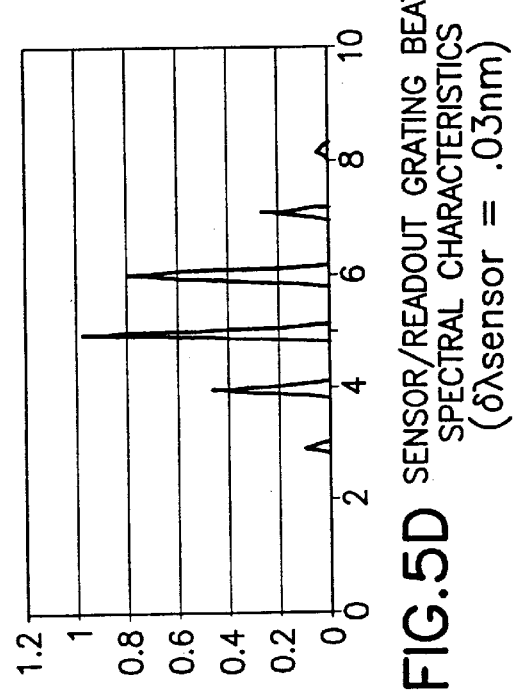
FIG.5B SENSOR/READOUT GRATING BEAT SPECTRAL CHARACTERISTICS (δλsensor = .01nm)
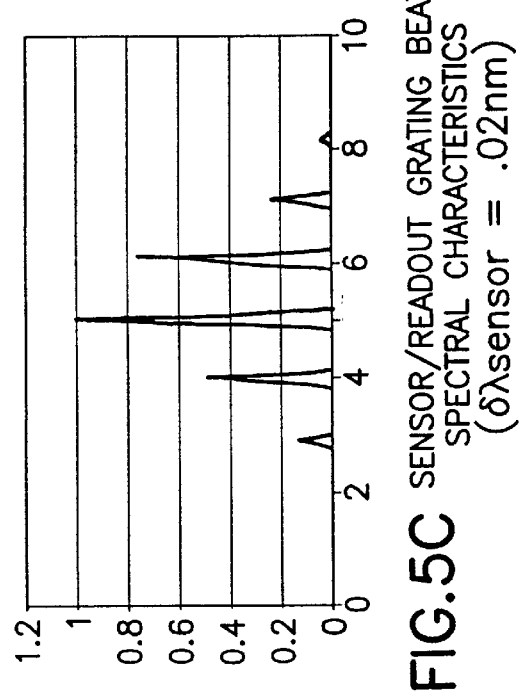
FIG.5D SENSOR/READOUT GRATING BEAT SPECTRAL CHARACTERISTICS (δλsensor = .03nm)
FIG.5A SENSOR/READOUT GRATING BEAT SPECTRAL CHARACTERISTICS (δλsensor = .00nm)
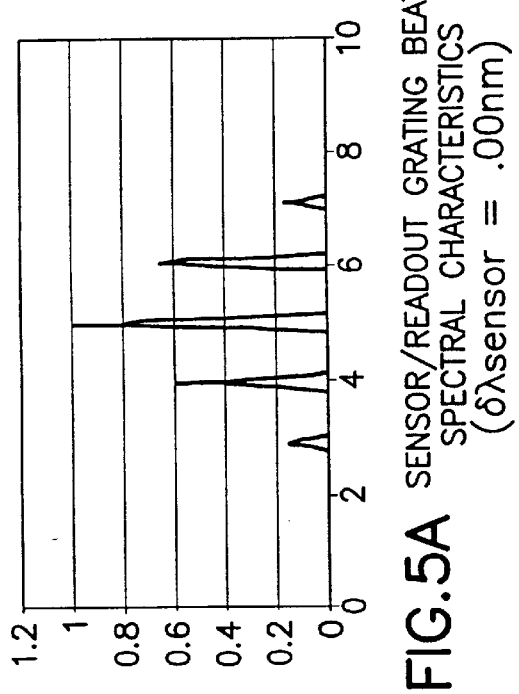
FIG.5C SENSOR/READOUT GRATING BEAT SPECTRAL CHARACTERISTICS (δλsensor = .02nm)

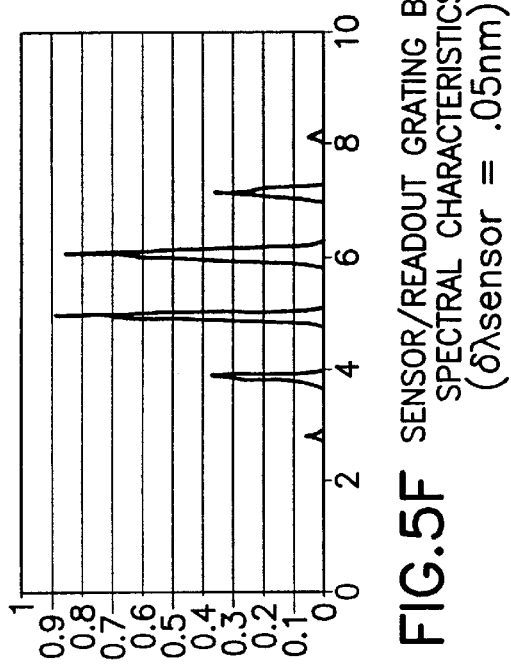

FIG.5E SENSOR/READOUT GRATING BEAT SPECTRAL CHARACTERISTICS ($\delta\lambda sensor = .04nm$)

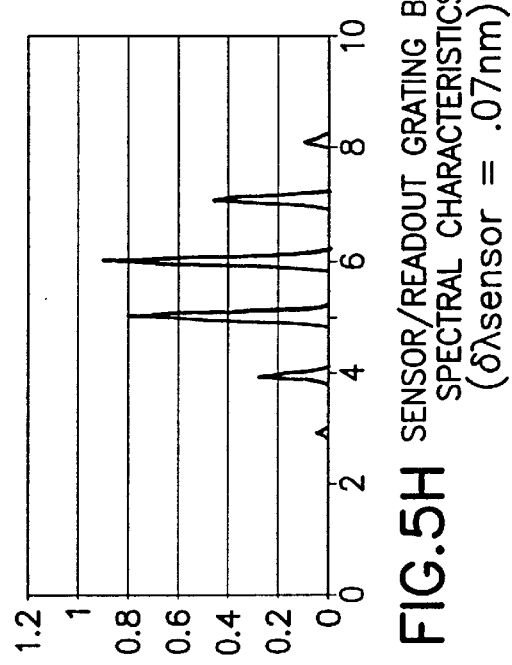

FIG.5F SENSOR/READOUT GRATING BEAT SPECTRAL CHARACTERISTICS ($\delta\lambda sensor = .05nm$)

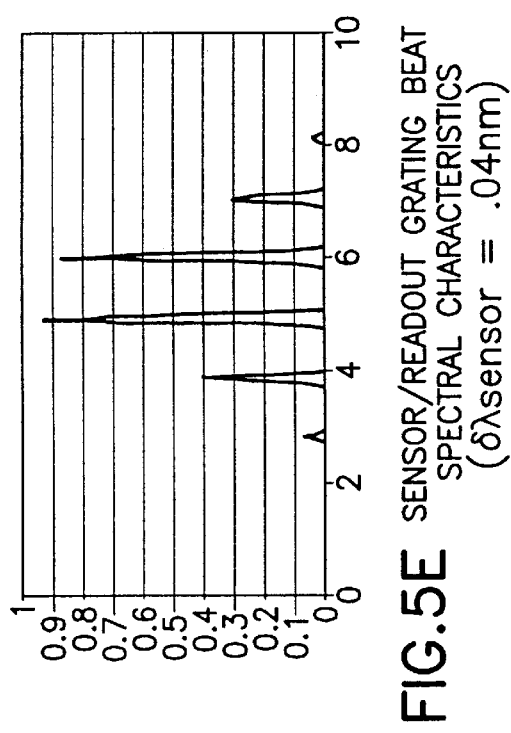

FIG.5G SENSOR/READOUT GRATING BEAT SPECTRAL CHARACTERISTICS ($\delta\lambda sensor = .06nm$)

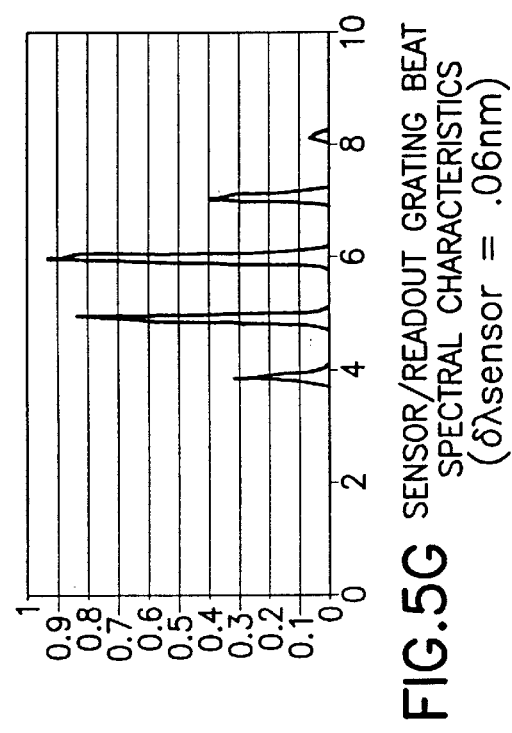

FIG.5H SENSOR/READOUT GRATING BEAT SPECTRAL CHARACTERISTICS ($\delta\lambda sensor = .07nm$)

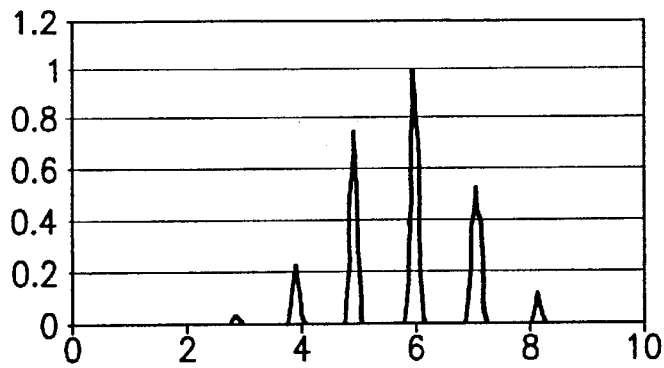
FIG.5I SENSOR/READOUT GRATING BEAT SPECTRAL CHARACTERISTICS ($\delta\lambda$sensor = .08nm)
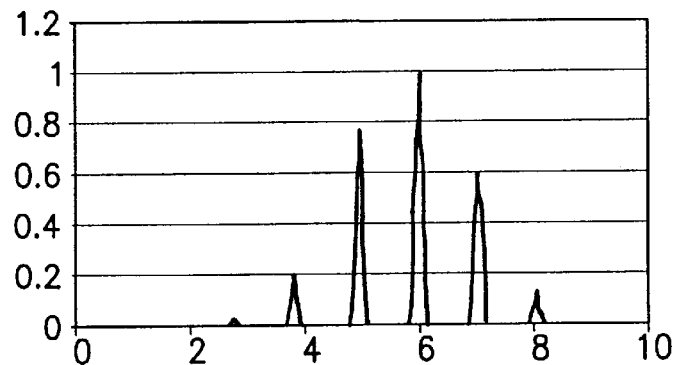
FIG.5J SENSOR/READOUT GRATING BEAT SPECTRAL CHARACTERISTICS ($\delta\lambda$sensor = .09nm)
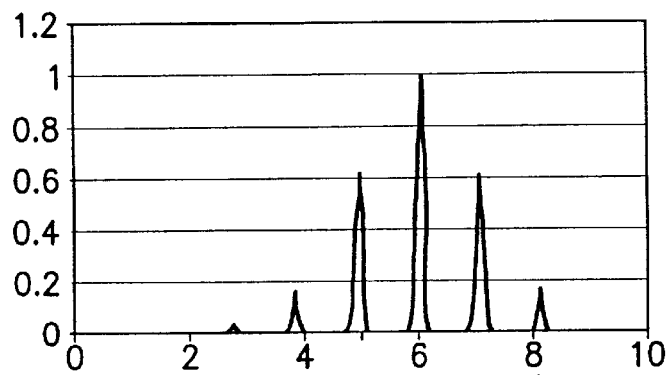
FIG.5K SENSOR/READOUT GRATING BEAT SPECTRAL CHARACTERISTICS ($\delta\lambda$sensor = .10nm)

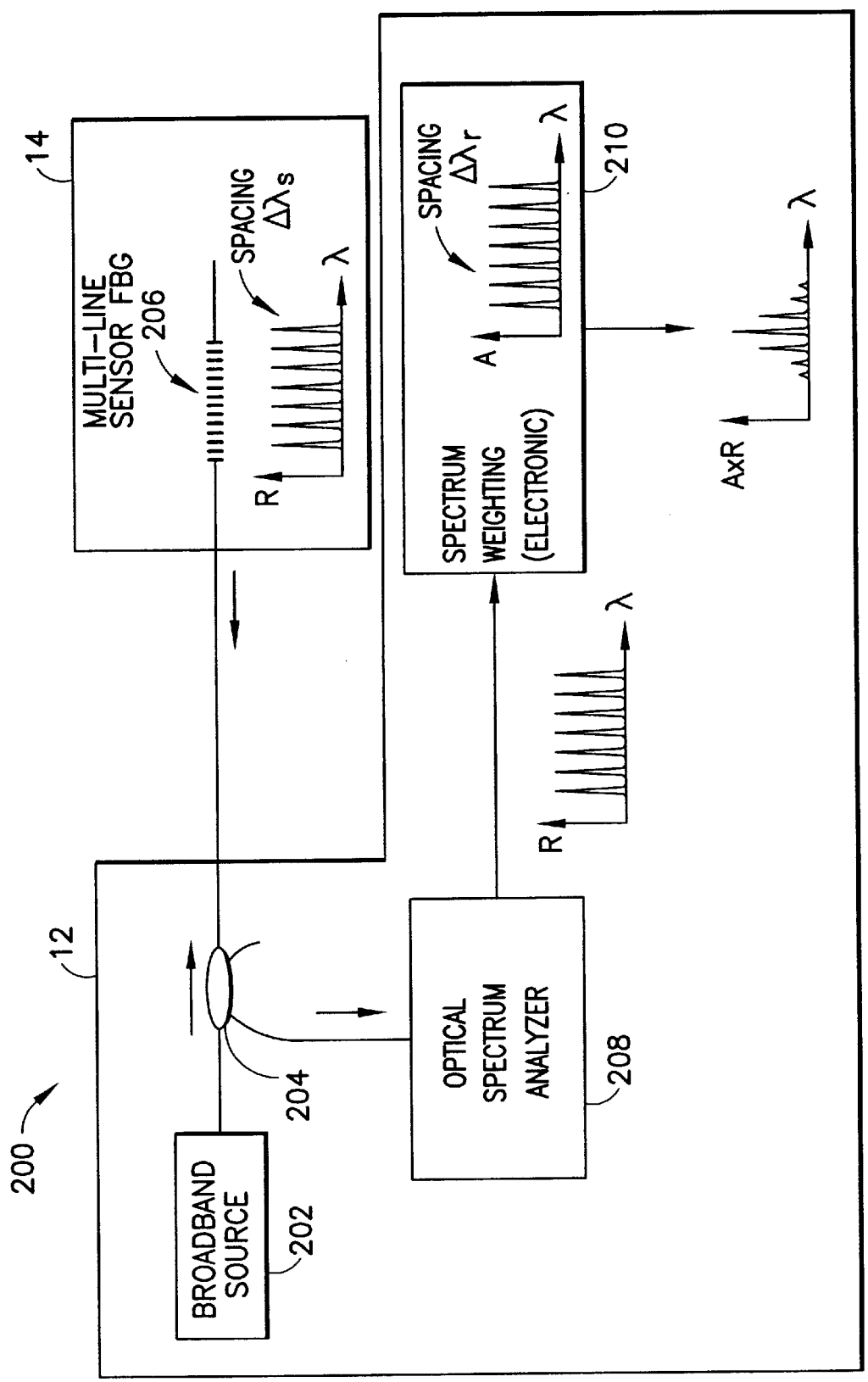
FIG. 6  ENHANCED SCALE FACTOR BY ELECTRONICALLY MULTIPLIED REFERENCE (WEIGHTING) SPECTRUM

FIBER BRAGG GRATING SENSOR SYSTEM HAVING ENHANCED STRAIN-TO-WAVELENGTH RESPONSIVITY BY USING A SPECTRAL BEATING BASED VERNIER EFFECT

BACKGROUND OF INVENTION

1. Technical Field

The present invention relates to a sensor for sensing a parameter such as strain or temperature; and more particularly to a sensor system having a structured sensor fiber Bragg grating (i.e. multi-line spectral response) in combination with a structured 'receiver' or 'readout' fiber Bragg grating with similar spectral characteristics. The spacing of the multi-line components of the structured sensor grating are different to that of the structured readout grating so that the two 'beat' to produce an amplified response to strain/temperature or other parameters as desired. The concept would apply to multiplexing using time-multiplexing or some form of frequency multiplexing. The "mixing" or "beating" may also be accomplished by electronically multiplying a structured sensor grating signal with a simulated reference grating signal to achieve the same result.

2. Description of Related Art

FIG. 1A shows a fiber grating based sensor, such as Bragg gratings, that typically exhibit a single, sharp resonance feature which is tracked as the fiber is subjected to strain or temperature variations (or other parameters via a suitable transduction mechanism). The wavelength shift with strain and temperature is normally expressed via the normalized response expressions:

$$\left(\frac{1}{\lambda}\right)\left(\frac{\delta\lambda}{\delta\varepsilon}\right) = \eta\varepsilon$$

$$\left(\frac{1}{\lambda}\right)\left(\frac{\delta\lambda}{\delta T}\right) = \Delta T$$

For example, a fiber grating at a nominal wavelength of 1.3 micrometers, has a response of about 1 nanometer of wavelength shift per 1000 microstrain (0.1%) or a temperature of about 100 Celsius. This intrinsic responsivity is a function of the silica glass and waveguide parameters, and is thus a fixed quantity. (Slight variations could be induced by radically changing the host glass, doping the fiber, or by using certain waveguide geometries). The minimum change in strain (or other parameters) which can thus be detected and determined in large part by this responsivity factor. In the case cited above, if a grating wavelength shift of 1 picometer (i.e. $10^{-12}$ meters) can be detected, a 1 nanometer/1000 microstrain responsivity corresponds to a minimum detectable strain of about 1 microstrain. This responsivity, or 'scale factor', can be enhanced by utilizing a spectral beating effect.

FIG. 1B shows a grating with multi-spectral line components produced by taking a normal grating and overlaying an 'amplitude' modulation along its length. This modulation of the grating strength along its length produces 'sidebands' in the spectral response of the device. These sidebands are spaced at an interval in wavelength space determined by the periodicity of the overlaid 'super-structure' grating amplitude modulation function. FIG. 1B shows the type of response typically observed.

SUMMARY OF INVENTION

The present invention provides a new and unique fiber Bragg grating sensor system for sensing a parameter, including temperature or strain, comprising: a structured sensor fiber Bragg grating in combination with a broadband light source, coupler, readout grating mixing and spectral analysis system.

The structured sensor fiber Bragg grating responds to an optical signal, and further responds to a sensed parameter, for providing a structured sensor fiber Bragg grating signal containing information about the sensed parameter.

The broadband light source, coupler, readout grating mixing and spectral analysis system provides the optical signal, and responds to the structured sensor fiber Bragg grating signal, mixes the structured fiber Bragg grating sensor signal with a reference grating spectrum, for providing a broadband source, coupler, readout grating mixing and spectral analysis system signal containing information about a mixed spectral analysis of the structured sensor fiber Bragg grating signal that is used to determine the sensed parameter.

In one embodiment, the structured sensor fiber Bragg grating signal is mixed with the readout reference grating spectrum by reflecting it off a structured readout fiber Bragg grating, for providing a combined structured sensor and readout fiber Bragg grating signal to a spectral analysis system.

In effect, the present invention provides a grating based sensor in which the wavelength response, or shift, to a particular parameter, such as strain, is amplified over that normally attained by using a combination of 'sensor' and 'readout' gratings, each with multi-spectral line components. The spacing between these components is different for the sensor and readout gratings, and thus a beating between the two elements occurs which gives rise to an enhanced overall response.

If two of these structured gratings are used in combination, a beating effect between the two gratings is observed, which can result in an amplification of the effective scale factor of the system, and thus an improvement in the minimum detectable strain.

In another embodiment, the structured sensor fiber Bragg grating signal is analyzed with an optical spectrum analyzer, then electronically mixed with the readout reference grating spectrum by multiplying (weighting) it with a simulated reference grating spectrum signal in a spectrum weighting device. In this case, the "mixing" or "beating" process is accomplished electronically to yield the same result as in the first embodiment.

The foregoing and other objects, features and advantages of the present invention will become more apparent in light of the following detailed description of exemplary embodiments thereof, as illustrated in the accompanying drawing.

BRIEF DESCRIPTION OF THE DRAWING

FIG. 1A is a diagram of a uniform grating spectral response, including a uniform grating, an input spectrum and a single-component output spectrum.

FIG. 1B is a diagram of a structured grating spectral response, including a structured grating, an input spectrum and a multi-component output spectrum.

FIG. 3 is a schematic diagram of one embodiment of the fiber Bragg grating sensor system shown in FIG. 2.

FIG. 4, shows sensor, readout and beat grating spectral characteristics.

FIG. 5, including FIGS. 5A, 5B, 5C, 5D, 5E, 5F, 5G, 5H, 5I, 5J, 5K shows sensor/readout grating beat spectral characteristics.

FIG. 6 is a schematic diagram of another embodiment of the fiber Bragg grating sensor system shown in FIG. 2.

DETAILED DESCRIPTION OF THE INVENTION

FIG. 2: The Basic Invention

Figure 2:
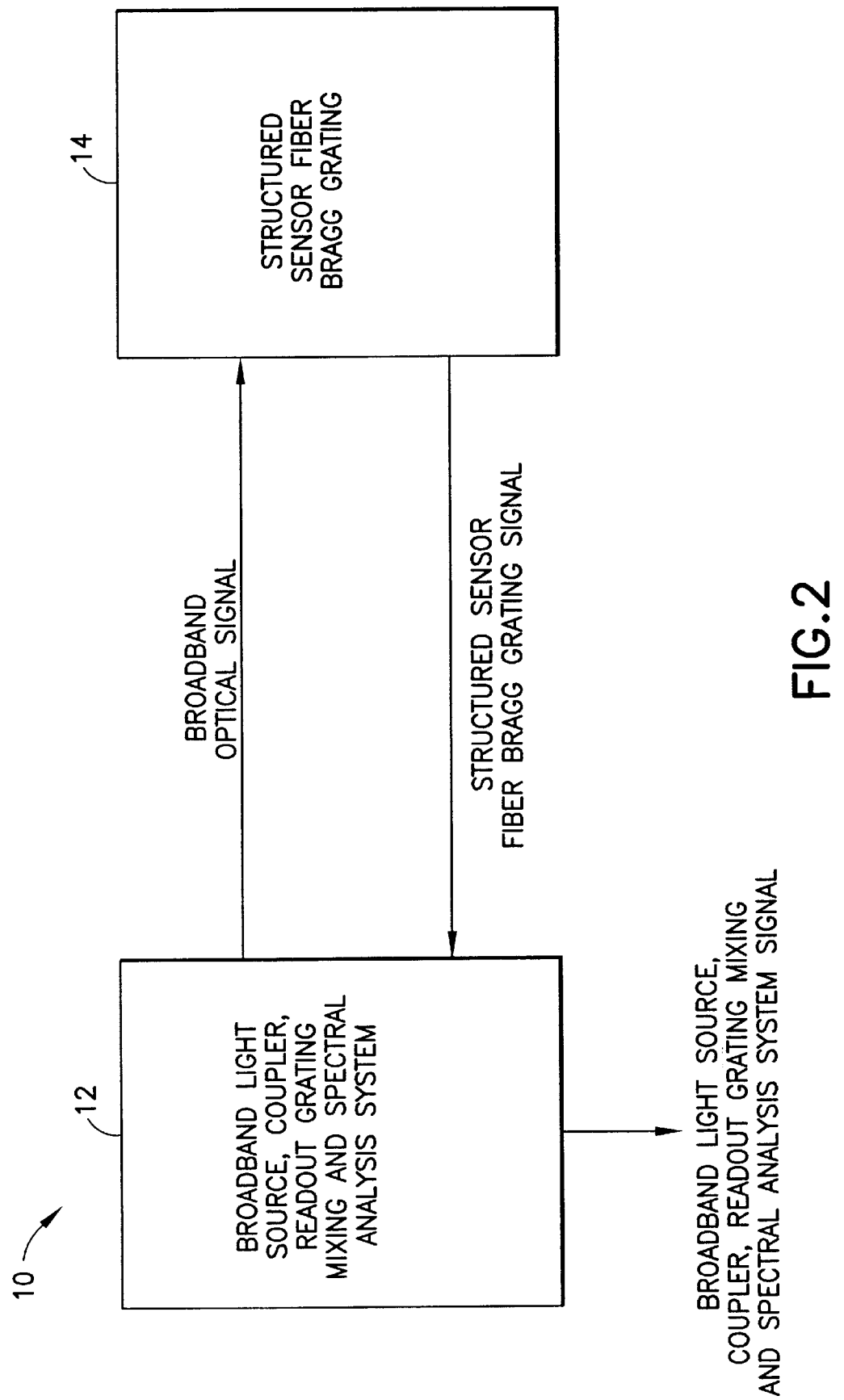
FIG. 2 is a block diagram of a fiber Bragg grating sensor system that is the subject matter of the present invention.

FIG. 2 shows a new and unique fiber Bragg grating sensor system generally indicated as 10 for sensing a parameter, including temperature or strain, comprising a broadband light source, coupler, readout grating mixing and spectral analysis system 12 in combination with a structured sensor fiber Bragg grating 14.

The structured sensor fiber Bragg grating 14 responds to a broadband optical signal, and further responds to the parameter to be sensed, for providing a structured sensor fiber Bragg grating signal containing information about the parameter to be sensed.

The broadband light source, coupler, readout grating mixing and spectral analysis system 12 provides the broadband optical signal to the structured sensor fiber Bragg grating 14. The broadband light source, coupler, readout grating mixing and spectral analysis system 12 also responds to the structured sensor fiber Bragg grating signal, mixes the structured fiber Bragg grating sensor signal with a reference grating spectrum, for providing a broadband source, coupler, readout grating mixing and spectral analysis system signal containing information about a mixed spectral analysis of the structured sensor fiber Bragg grating signal that is used to determine the sensed parameter.

In one embodiment discussed in relation to FIGS. 2–5, the structured sensor fiber Bragg grating signal is mixed by reflecting it off a structured readout fiber Bragg grating, for providing a combined structured sensor and readout fiber Bragg grating signal to a spectral analysis system.

In another embodiment discussed in relation to FIG. 6, the structured sensor fiber Bragg grating signal is analyzed with an optical spectrum analyzer, then electronically mixed with the reference grating spectrum by multiplying it with a simulated reference grating spectrum in a spectrum weighting device.

FIG. 3; Mixing By Reflection

FIG. 3 shows the principle of operation of the sensor system generally indicated as 100 and consistent with the sensor system 10 shown in FIG. 2. The sensor system 100 includes a broadband source 102, a first coupler 104, a structured sensor grating 106, a second coupler 108, a structured readout fiber Bragg grating 110 and a spectral analysis system 112.

The broadband source 102 illuminates the structured grating sensor 106. The light reflected from the structured grating sensor 106 comprises many spectral components, all of which that shift at the intrinsic grating responsivity scale factor discussed above. The multi-spectral components of the structured sensor grating 106 are reflected off the structured readout grating 110 and then onto the spectral analysis system 112, which comprises a scanning filter or other spectral analysis system (e.g. other form of spectrometer). The spectral analysis system 112 is known in the art, and the scope of the invention is not intended to be limited to any particular embodiment thereof. The spacing between the multi-spectral components of the structured sensor and readout gratings 106, 110 are slightly different, such that not all the spectral lines align at the output. Some spectral components will however align, and an effective resonance will be observed at this wavelength by a scanning filter wavelength detection system in the spectral analysis system 112.

FIGS. 4 and 5: Sensor, Readout and Beating Spectral Characteristic

FIG. 4 illustrates the principle of operation of the scheme: It is assumed that the signals from the structured sensor and readout fiber Bragg gratings 106, 110 have spectrally overlapping components at a wavelength $\lambda o$. The signals from the structured sensor and readout gratings 106, 110 will overlap again at a wavelength determined by the relative spacing between the components of the two gratings. If $\Delta\lambda s$ is the spacing between the spectral components of the structured sensor grating 106, and $\Delta\lambda r$ is the spacing between components of the structured readout grating 110, then the grating resonances will align again after a wavelength determined by the lowest common denominator of $\Delta\lambda s$ and $\Delta\lambda r$. For example, for $\Delta\lambda s=1.1$ nanometers and $\Delta\lambda r=1.0$ nanometers, the grating resonances align again every 10 nanometers. The detection system 112 thus 'sees' a resonance at each of these wavelengths. As the spectra of the structured sensor grating 106 shifts with applied strain (as an example), the position of the resonance alignment now shifts, in an amplified sense, with respect to the actual grating shift itself. To understand this, consider the above situation of two gratings with $\Delta\lambda s=1.1$ nanometers and $\Delta\lambda r=1.0$ nanometers, the offset between the next pair of resonances above the aligned pair is 0.1 nanometers. A shift of 0.1 nanometers in the sensor grating, thus results in a shift in the effective resonance position seen by the detection system of 1.0 nanometer. A 0.2 nanometer shift in the sensor grating produces a 2.0 nanometer shift. The effective wavelength shift can be related to the actual shift via the expression:

$$\zeta = \left(\frac{\Delta\lambda r}{\Delta\lambda r - \Delta\lambda s}\right)$$

The operation of this scheme is analogous to the Vernier effect used in many precision measurement systems. The resonances are only truly 'aligned' at certain discrete wavelengths, however, the degree of alignment can be assessed by a centroid interpolation from the response seen by the wavelength detection system.

FIG. 5 shows a progression of an effective wavelength spectrum coupled to the detection system as the sensor grating strain is varied. As shown, the system response is modeled for a sensor grating with a structured sensor component spacing of 1 nanometer and a structured readout grating spacing of 1.1 nanometers. The beat spectral shift gain factor $\xi$ is 10. Consequently, for a sensor spectral shift of 0.1 nanometers, the beat spectrum shifts by 1.0 nanometer. This gain factor of 10 in the improvement of the response can be a useful method of achieving a higher resolution sensor system. The concept can be applied for gains >10, e.g. gains of 20 or possibly 50 should in principle be attainable. The system exhibits strong spectral peaks when the sensor and readout grating resonances fully align, but between, peaks are still observed, and the degree of alignment could be determined via a centroid interpolation procedure.

As an alternative to super-structure gratings, grating devices can be produced using short individual elements written either at the same spatial location in the fiber, or immediately adjacent to each other in a serial fashion.

FIG. 6: Mixing Electronically

In the embodiment shown and described in relation to FIGS. 2–5, the return multi-line grating signal is "mixed" or "beat" with a second reference multi-line grating of a slightly different frequency to give the "Vernier" effect. This is done by actually reflecting the sensor signal off a reference grating having the correct properties.

FIG. 6 shows an alternative embodiment of the present invention. Instead of monitoring the spectral beating between a multi-line sensor FBG 106 and a reference spectral readout grating 110 in FIG. 3, as an alternative to using the "readout" grating, a spectral response of the multi-line sensor grating can be monitored and a reference grating spectrum electronically applied to a receive signal, e.g. the spectral data points electronically weighted by a reference fiber Bragg grating.

For example, FIG. 6 shows a fiber Bragg grating sensor system generally indicated as 200 having enhanced strain-to-wavelength responsivity by using a spectral beating based Vernier effect, comprising: a broadband source 202, an optical coupler 204, a structured sensor fiber Bragg grating 106, an optical spectrum analyzer 208 and a spectrum weighting device 210. The broadband source 202 provides a broadband optical signal. The optical coupler 204 responds to the broadband optical signal, for providing a coupled broadband optical signal. The structured sensor fiber Bragg grating 106 responds to the coupled broadband optical signal, and further responds to a sensed parameter, for providing a structured sensor fiber Bragg grating signal containing information about the sensed parameter. The optical coupler 204 further responds to the structured sensor fiber Bragg grating signal, for providing a coupled structured sensor fiber Bragg grating signal. The optical spectrum analyzer 208 responds to the coupled structured sensor fiber Bragg grating signal, for providing an optical spectrum analyzer signal containing information about a spectrum analyzed coupled structured sensor fiber Bragg grating signal. The optical spectrum analyzer 208 is known in the art. The spectrum weighting device 210 responds to the optical spectrum analyzer signal, electronically mixes the optical spectrum analyzer signal with a simulated reference grating spectrum signal, for providing a spectrum weighting device signal containing information about a mixed and spectrum analyzed coupled structured sensor fiber Bragg grating signal after the reference grating spectrum signal is electronically applied thereto that is used to determine the sensed parameter. The spectrum weighting device 210 may be implemented with software using a typical microprocessor-based architecture, including a microprocessor, a Random Access Memory (RAM), a Read Only Memory (ROM), input/output devices and address and data buses for coupling the same.

In the embodiment in FIG. 6, the "mixing" or "beating" process is accomplished electronically. In effect, when the full sensor spectrum is detected, it is electronically multiplied (weighted) by a simulated 'reference' grating spectrum to yield the same result as that shown and described in relation to FIGS. 2–5. The 'frequency' of this simulated grating would be set by the software allowing greater flexibility when compared to using only a hardware component/device.

Some advantages of this embodiment include: Vernier multiplication factor can be chosen as desired, i.e., this could serve to give a "zoom" capability. There is no need for a precisely held reference device. Multiple sensors can be interrogated if they occupied different wavelength "bands".

Scope of the Invention

Although the invention has been described and illustrated with respect to exemplary embodiments thereof, the foregoing and various other additions and omissions may be made therein and thereto without departing from the spirit and scope of the present invention.

I claim:

1. A fiber Bragg grating sensor system for sensing a parameter, including temperature or strain, comprising:
   a structured sensor fiber Bragg grating, responsive to an optical signal, and further responsive to a sensed parameter, for providing a structured fiber Bragg grating sensor signal containing information about the sensed parameter; and
   a broadband light source, coupler, readout grating mixing and spectral analysis system for providing the optical signal, and responsive to the structured sensor fiber Bragg grating signal, mixing the structured fiber Bragg grating sensor signal with a reference grating spectrum, for providing a broadband source, coupler, readout grating mixing and spectral analysis system signal containing information about a mixed spectral analysis of the structured sensor fiber Bragg grating signal that is used to determine the sensed parameter.

2. A fiber Bragg grating sensor system according to claim 1,
   wherein the structured sensor fiber Bragg grating signal is mixed with the reference grating spectrum by reflecting it off a structured readout fiber Bragg grating, for providing a combined structured sensor and readout fiber Bragg grating signal to a spectral analysis system.

3. A fiber Bragg grating sensor system according to claim 1,
   wherein the structured sensor fiber Bragg grating signal is analyzed with an optical spectrum analyzer, then electronically mixed with the reference grating spectrum by multiplying it with a simulated reference grating spectrum signal in a spectrum weighting device.

4. A fiber Bragg grating sensor system according to claim 1,
   wherein the broadband light source, coupler, readout mixing and spectral analysis system includes a broadband light source, a first optical coupler, a second optical coupler, a structured readout fiber Bragg grating and a spectral analysis system;
   wherein the first optical coupler provides the optical signal from the broadband light source to the structured sensor fiber Bragg grating;
   wherein the first coupler and the second optical coupler provide the structured sensor fiber Bragg grating signal to the structured readout fiber Bragg grating; and
   wherein the second optical coupler provides a combined structured sensor and readout fiber Bragg grating signal to spectral analysis system.

5. A fiber Bragg grating sensor system according to claim 1,
   wherein the broadband light source, coupler, readout mixing and spectral analysis system includes a broadband light source, a first optical coupler, an optical spectrum analyzer and a spectrum weighting device;
   wherein the first optical coupler provides the optical signal from the broadband light source to the structured sensor fiber Bragg grating;
   wherein the first coupler provides the structured sensor fiber Bragg grating signal to the optical spectrum analyzer; and wherein the optical spectrum analyzer provides an optical spectrum analyzer signal to the spectrum weighting device.

6. A fiber Bragg grating sensor system having enhanced strain-to-wavelength responsivity by using spectral beating based Vernier effect, comprising:

a broadband source for providing a broadband optical signal;

a first optical coupler, responsive to the broadband optical signal, for providing a coupled broadband optical signal, and further responsive to a structured sensor fiber Bragg grating signal containing information about a sensed parameter, for providing a first coupled structured sensor fiber Bragg grating signal;

a structured sensor fiber Bragg grating, responsive to the coupled broadband optical signal, for providing the structured sensor fiber Bragg grating signal;

a second optical coupler having a wavelength spacing, responsive to the structured sensor fiber Bragg grating signal, for providing a coupled structured sensor fiber Bragg grating signal, and further responsive to a structured readout fiber Bragg grating signal containing information about an amplified response to the sensed parameter, for providing a coupled structured readout fiber Bragg grating signal;

a structured readout fiber Bragg grating having a different wavelength spacing than the wavelength spacing of the structured sensor fiber Bragg grating, responsive to the coupled structured sensor fiber Bragg grating signal, for providing the structured readout fiber Bragg grating signal containing information about the mixing of the structured sensor fiber Bragg grating signal with a reference grating spectrum; and a spectral analysis system, responsive to the coupled structured readout fiber Bragg grating signal, for providing a spectral analysis system signal containing information about the sensed parameter.

7. A fiber Bragg grating sensor system having enhanced strain-to-wavelength responsivity by using spectral beating based Vernier effect, comprising:

a broadband source for providing a broadband optical signal;

an optical coupler, responsive to the broadband optical signal, for providing a coupled broadband optical signal, and further responsive to a structured sensor fiber Bragg grating signal containing information about a sensed parameter, for providing a coupled structured sensor fiber Bragg grating signal;

a structured sensor fiber Bragg grating, responsive to the coupled broadband optical signal, and further responsive to a sensed parameter, for providing the structured sensor fiber Bragg grating signal containing information about the sensed parameter;

an optical spectrum analyzer, responsive to the coupled structured sensor fiber Bragg grating signal, for providing an optical spectrum analyzer signal containing information about a spectrum analyzed coupled structured sensor fiber Bragg grating signal; and a spectrum weighting device, responsive to the spectrum analyzer signal, for providing a spectrum weighting device signal containing information about the mixing of the spectrum analyzed coupled structured sensor fiber Bragg grating signal with a reference grating spectrum that is used to determine the sensed parameter.

* * * * *

UNITED STATES PATENT AND TRADEMARK OFFICE
CERTIFICATE OF CORRECTION

PATENT NO.      : 6,448,551 B1                                    Page 1 of 1
DATED           : September 10, 2002
INVENTOR(S)     : Alan D. Kersey It is certified that error appears in the above-identified patent and that said Letters Patent is hereby corrected as shown below:

Column 2,
Line 63, after "Fig. 4" -- including FIGS. 4A, 4B, 4C -- should be inserted.

Column 3,
Line 33, "of f" should be -- off --.
Line 43, after "Fig. 3" ";" should be -- : --.

Signed and Sealed this

First Day of April, 2003

JAMES E. ROGAN
*Director of the United States Patent and Trademark Office*